US012540723B1

(12) United States Patent
Chen et al.

(10) Patent No.: US 12,540,723 B1
(45) Date of Patent: Feb. 3, 2026

(54) LIGHTING APPARATUS

(71) Applicant: SHENZHEN HABITAT TECHNOLOGY CO., LTD, Shenzhen (CN)

(72) Inventors: Jing Chen, Shenzhen (CN); Yong Chen, Shenzhen (CN)

(73) Assignee: SHENZHEN HABITAT TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 19/325,450

(22) Filed: Sep. 10, 2025

Related U.S. Application Data

(63) Continuation of application No. PCT/CN2025/111435, filed on Jul. 30, 2025.

(30) Foreign Application Priority Data

Jul. 31, 2024 (CN) ......................... 202421847914.7

(51) Int. Cl.
*F21V 21/22* (2006.01)
*F21S 9/02* (2006.01)
*F21V 21/14* (2006.01)
*F21V 21/28* (2006.01)
*F21V 23/00* (2015.01)

(52) U.S. Cl.
CPC ................ *F21V 21/22* (2013.01); *F21S 9/02* (2013.01); *F21V 21/145* (2013.01); *F21V 21/28* (2013.01); *F21V 23/001* (2013.01)

(58) Field of Classification Search
CPC ........ F21V 21/22; F21V 21/28; F21V 21/145; F21V 23/001; F21S 9/02
See application file for complete search history.

(56) References Cited

U.S. PATENT DOCUMENTS

| | | | | |
|---|---|---|---|---|
| 11,873,977 B2* | 1/2024 | Cornell | F21V 21/06 | |
| 2005/0117340 A1* | 6/2005 | Lee | F21V 23/04 | 362/249.16 |
| 2011/0122605 A1* | 5/2011 | Deighton | F16M 11/10 | 362/183 |
| 2018/0058673 A1* | 3/2018 | Fang | F21L 14/00 | |
| 2023/0228409 A1* | 7/2023 | Chen | F21V 23/06 | 362/418 |
| 2023/0349519 A1* | 11/2023 | Kwong | F21V 21/22 | |

* cited by examiner

*Primary Examiner* — James R Greece
*Assistant Examiner* — Michael Chiang
(74) *Attorney, Agent, or Firm* — JEEN IP LAW, LLC

(57) ABSTRACT

A lighting apparatus comprises a lamp head, a central shaft, and a stand. The lamp head and the stand are each connected to the central shaft. While the lamp head is maintained in a fixed relative position to the central shaft, the stand can not only slide axially relative to the central shaft to adjust an illumination height of the lamp head, but can also rotate circumferentially relative to the central shaft to adjust a circumferential lighting orientation of the lamp head. The axial sliding and circumferential rotation of the stand relative to the central shaft correspondingly adjusts the illumination height and circumferential lighting orientation of the lamp head, operation is convenient and simple.

10 Claims, 10 Drawing Sheets

LIGHTING APPARATUS

CROSS-REFERENCE TO RELATED APPLICATIONS

The present application is a Continuation of PCT/CN2025/111435, filed on Jul. 30, 2025, which claims priority to Chinese Patent Application No. 202421847914.7, filed on Jul. 31, 2024. The entire contents of the aforementioned applications are hereby incorporated by reference.

TECHNICAL FIELD

The present disclosure relates to the field of lighting technology, and more particularly, to a lighting apparatus.

BACKGROUND

Typically, a lighting apparatus, as a type of lighting appliance with a stand, can be supported on a supporting surface for illumination. To adapt to various lighting scenarios, the lamp head needs to be flexibly adjusted in terms of its circumferential lighting orientation and illumination height. In a conventional lighting apparatus, the circumferential lighting orientation is typically changed by rotating the lamp head itself, assuming the battery box and the stand are in a fixed relative position; while the lighting height is adjusted by sliding the stand relative to a battery box, assuming the lamp head and the battery box are also in a fixed relative position. This means that the adjustment of the lamp head's height and circumferential orientation requires separate and independent operations, which can be cumbersome and time-consuming.

SUMMARY

The present disclosure aims to provide a lighting apparatus that is easier for a user to operate, allowing for convenient and rapid adjustment of the lamp head's height and circumferential orientation to accommodate a wider range of lighting scenarios.

To solve the aforementioned technical problem, the present disclosure adopts the following technical solution:

A lighting apparatus is provided, comprising:

In one embodiment, a central shaft having a mounting end and a supporting end that are axially opposite to each other;

a lamp head connected to the mounting end;

a support plate rotatably connected to the supporting end about a circumferential direction of the central shaft;

a stand, comprising a collar, a plurality of legs, and a plurality of struts, wherein the collar is sleeved on an outer wall of the central shaft, each of the legs has a first end and a second end that are axially opposite to each other, the first end is rotatably connected to a side periphery of the collar, and the second ends are configured to be spaced apart from each other to be supported on a supporting surface; each of the struts is connected between the support plate and one of the legs, and each of the struts has a third end and a fourth end that are axially opposite to each other, the third end is pivotally connected to an inner side of the corresponding leg, and the fourth end is pivotally connected to a side periphery of the support plate;

wherein the collar is configured to be reciprocally movable along an axial direction of the central shaft to change an included angle between any two of each leg, a corresponding one of the plurality of struts, and the central shaft, thereby changing a height of the stand; and the central shaft and the lamp head are configured to be rotatable synchronously with respect to the stand about the circumferential direction of the central shaft.

Based on the above technical solution, the embodiments of the present disclosure have at least the following advantages and positive effects:

In the lighting apparatus provided by the present disclosure, the lamp head, as the primary illuminating element, is installed at one end of the central shaft, and the stand is sleeved on the central shaft to form a support stand for supporting the lighting apparatus on a supporting surface. With the lamp head and the central shaft being in a fixed relative position, the stand can not only slide axially relative to the central shaft to change the illumination height of the lamp head, but can also rotate circumferentially relative to the central shaft to change the circumferential lighting orientation of the lamp head. Therefore, compared to conventional lighting apparatuses, for the lighting apparatus of the present disclosure, the user only needs to operate the sliding and rotating of the stand relative to the central shaft to correspondingly adjust the circumferential lighting orientation and illumination height of the lamp head. That is, the user can hold the central shaft with one hand and adjust the stand with the other hand to achieve adjustments of both the illumination height and the circumferential lighting orientation. This is consistent with ergonomic design principles, significantly enhancing the convenience and practicality of the lighting apparatus itself and improving the user experience.

BRIEF DESCRIPTION OF THE DRAWINGS

In order to illustrate the technical solutions of the embodiments of the present disclosure or of the prior art more clearly, the following drawings are briefly described as required in the context of the embodiments or the prior art. Obviously, the following drawings illustrate only some of the embodiments of the present disclosure. Other relevant drawings may be obtained on the basis of the shown structures of these drawings without any creative effort by those skilled in the art.

Figure 1:
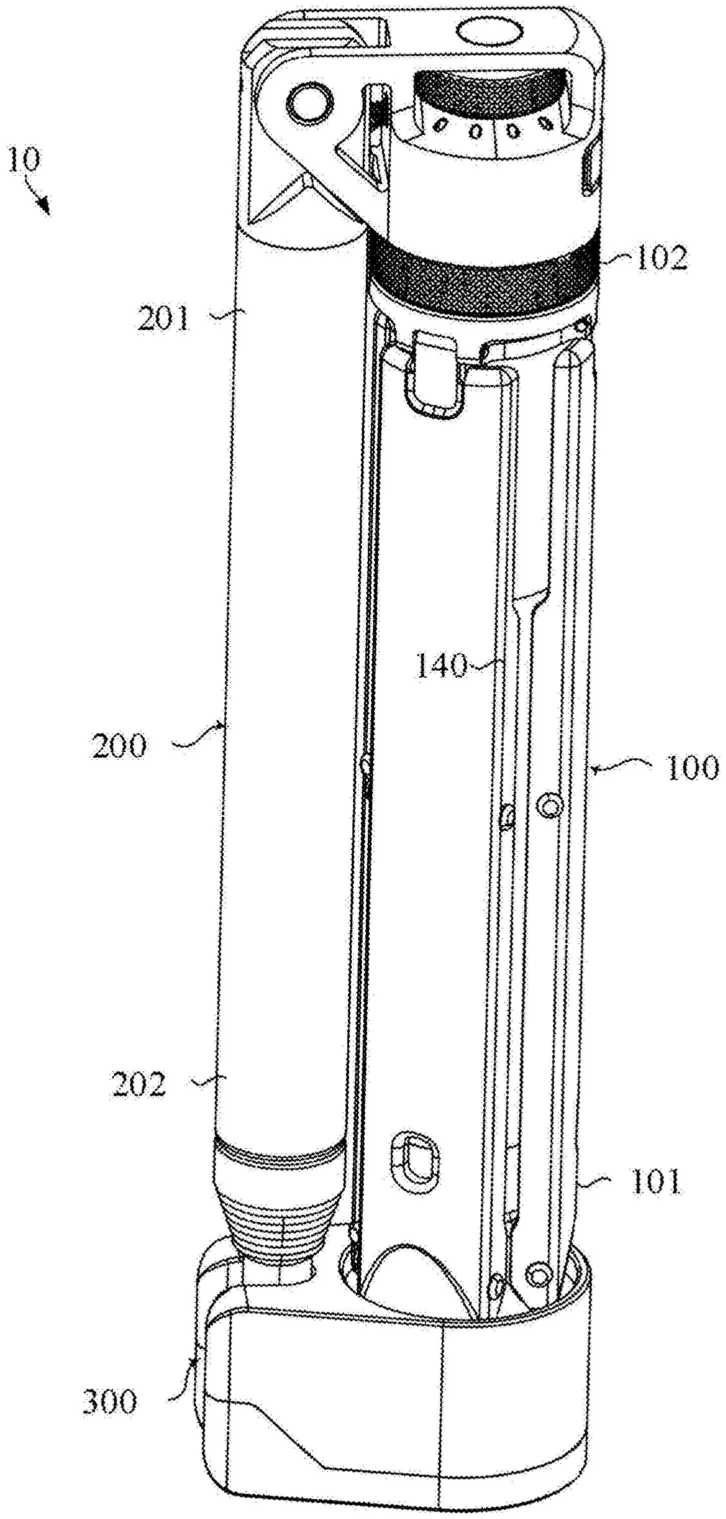
FIG. 1 is a structural schematic view of a lighting apparatus in a stowed state according to an embodiment of the present disclosure.

The following is a list of reference numerals used in the drawings:

10, lighting apparatus; 100, support rod; 101, supporting end; 102, mounting end; 103, mounting cavity; 110, central shaft; 111, tube body; 112, tube cover; 113, nut; 113*a*, stop portion; 114, retaining wall; 1141, upper side surface; 1142, lower side surface; 115, opening; 120, stand; 121, collar; 1211, sleeve; 1212, first lug; 1213, second lug; 1214, clearance gap; 122, leg; 1221, first end; 1222, second end; 1223, receiving groove; 1224, connecting block; 123, strut; 1231, third end; 1232, fourth end; 124, first rotation axis; 125, support pad; 130, support plate; 200, movable rod; 201, first connecting end; 202, second connecting end; 300, lamp head; 400, power supply assembly; 410, main board; 420, power supply structure; 421, conductive wire; and 430, battery.

DESCRIPTION OF EMBODIMENTS

Typical embodiments reflecting features and advantages of the present disclosure will be described in detail in the following description. It should be understood that the present disclosure may admit to various modifications in different embodiments without departing from the scope of the present disclosure. The descriptions and drawings therein are substantially illustrative in nature rather than restrictive of the present disclosure.

Furthermore, the related terms "first", and "second" are used for descriptive purposes only and are not to be understood as indicating or implying relative importance or implicitly specifying the number of technical features indicated. Thus, features defined as "first" or "second" may explicitly or implicitly include one or more of such features. In the description of the present application, the term "a plurality of" means two or more unless otherwise expressly specified.

In the description of the present application, it should be noted that terms such as "installed," "provided," and "connected" should be broadly understood unless otherwise expressly defined and limited. For example, a connection may be a fixed connection, a detachable connection, or an integral connection; may be a mechanical connection or an electrical connection; may be a direct connection or an indirect connection through an intermediate medium; and may be communication between interiors of two components. Those of ordinary skill in the art may understand the specific meanings of the above terms in the present disclosure based on practical contexts.

Figure 2:
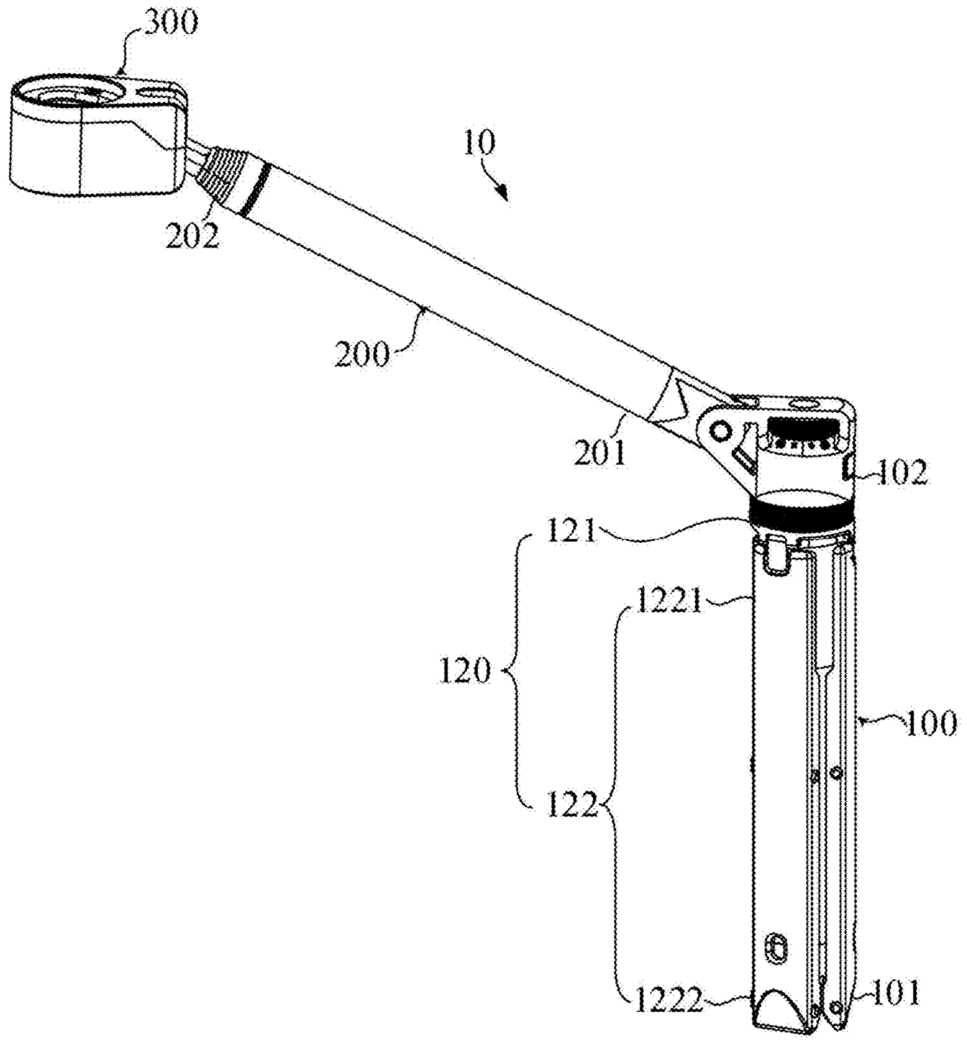
FIG. 2 is a structural schematic view of the lighting apparatus of FIG. 1 after a movable rod is switched to a deployed state.
Figure 3:
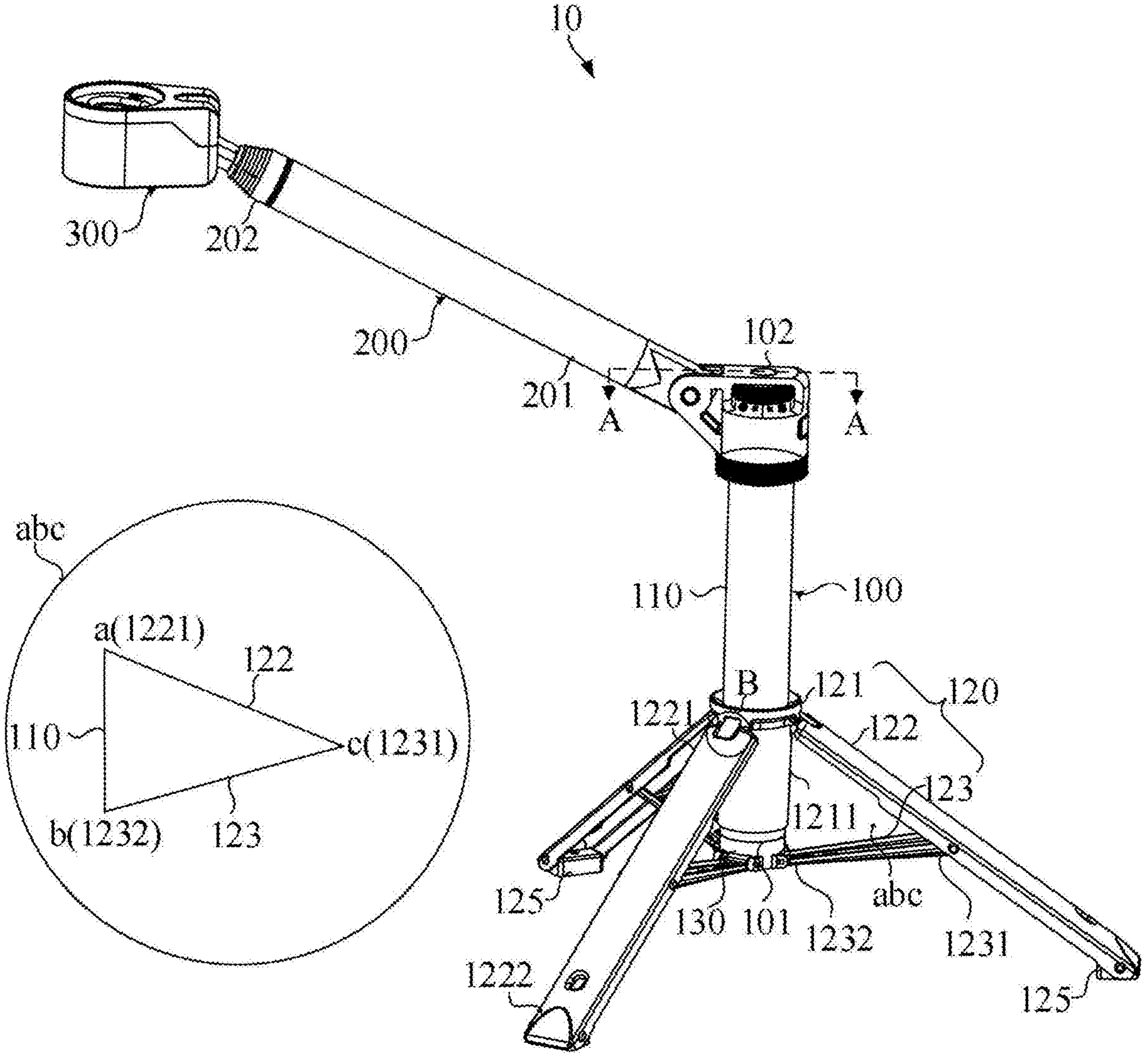
FIG. 3 is a structural schematic view of the lighting apparatus of FIG. 2 after the stand is switched to a deployed state.

With reference to FIG. 1 and FIG. 2, the present disclosure provides a lighting apparatus 10, which can be switched between a stowed state, a deployed state, and a stand state. In this embodiment, FIG. 1 illustrates the lighting apparatus 10 in a stowed state. In this state, the lighting apparatus 10 can be held by a user for portable use and to provide a lighting function. For example, the user can hold the lighting apparatus 10 to obtain illumination, which is convenient for the user's activities at night. At the same time, when the lighting apparatus 10 is in the stowed state, its volume and occupied space are small, which facilitates stowing and carrying for the user. FIG. 2 illustrates the lighting apparatus 10 in a deployed state. In the deployed state, the lighting apparatus 10 has a greater illumination height and a larger illumination range. At this time, the user can hold it by hand to provide lighting for a large area of moving space during outdoor camping, and use it as a mobile road light or a searchlight during night travel, which not only facilitates road guidance but also allows the user to observe the surrounding environment. FIG. 3 shows that, in other use scenarios, the lighting apparatus 10 can be further deployed into a stand state, so that the lighting apparatus 10 can be placed on a flat or uneven supporting surface to provide a lighting function. For example, when reading a book or looking at a computer at night, appropriate lighting is needed to protect the eyes from damage due to strong light. At this time, the lighting apparatus 10 can be supported on a tabletop to be used as a desk lamp. It should be understood that the lighting apparatus 10 of the present disclosure does not necessarily need to exhibit the stowed state shown in FIG. 1 and the deployed state shown in FIG. 2. It only in needs to be able to exhibit the stand state shown in FIG. 3 to support the lighting apparatus 10 on a supporting surface for illumination. Moreover, the deployment angle of the stand can be changed, and the supporting height of the lighting apparatus 10 can also be changed accordingly.

With reference to FIG. 1 and FIG. 2, the lighting apparatus 10 of the present disclosure includes a support rod 100, a movable rod 200, and a lamp head 300 connected in sequence. The movable rod 200 is movably connected to the support rod 100. The lamp head 300, as the illuminating component of the lighting apparatus 10, emits illumination light to provide a light source for the user. The lamp head 300 is connected to a free end of the movable rod 200 (the other end of the movable rod 200 relative to the support rod 100). The movable rod 200 is movable relative to the support rod 100, enabling the entire lighting apparatus 10 to be selectively switched between the deployed state and a folded state. Preferably, in this embodiment, the movable rod 200 is rotatably connected to an outer side of the support rod 100. The movable rod 200 pivots in a pitching manner relative to the support rod 100 along an axial direction of the support rod 100, until the movable rod 200 and the support rod 100 are in a side-by-side and adjacent posture to achieve the folding and stowing of the entire lighting apparatus 10. It should be understood that, in other embodiments, first, the lamp head 300 can also be directly connected to the support rod 100 to form the lighting apparatus 10; in the present application, the presence of the movable rod 200 is not limited. Second, in other embodiments, the angle of the pitching movement of the movable rod 200 relative to the support rod 100 is not limited, meaning that the movable rod 200 does not necessarily have to pivot to a position side-by-side with the support rod 100 to achieve the folding of the lighting apparatus 10. Last, in other embodiments, the movable rod 200 is not necessarily configured to pivot in a pitching manner relative to the support rod 100. That is, the stowing and folding of the lighting apparatus 10 is not limited in the present application.

Specifically, in this embodiment, the support rod 100, as a supporting body, has a supporting end 101 and a mounting end 102 that are axially opposite to each other. When the lighting apparatus 10 is in the deployed state, the support rod 100 can support the lighting apparatus 10 on a supporting surface. The movable rod 200 has a first connecting end 201 and a second connecting end 202 that are axially opposite to each other, with the first connecting end 201 connected to the mounting end 102, and the second connecting end 202 connected to the lamp head 300. Preferably, in this embodiment, the first connecting end 201 is rotatably connected to the mounting end 102. When the first connecting end 201 pivots relative to the mounting end 102, an included angle between the movable rod 200 and the support rod 100 changes, and the movable rod 200 is pivotable to be side-by-side and adjacent to the support rod 100. At this time, the movable rod 200 is folded and stowed on a side of the support rod 100, whereby the lighting apparatus 10 is switched from the deployed state to the stowed state. As shown in FIG. 1, when the lighting apparatus 10 is in the stowed state, that is, when the movable rod 200 and the support rod 100 are in a side-by-side and adjacent posture, the lamp head 300 clasps onto the supporting end 101. As used herein, the term "clasping" means a close engagement between the two, which can be achieved by a snap-fit, a hook, an adhesive, or a magnet. The lamp head 300 clasps onto the supporting end 101, which includes, but is not limited to, the lamp head 300 clasping onto the side periphery, edge, or bottom of the supporting end 101. It should be understood that, in other embodiments, whether the lamp head 300 clasps onto the supporting end 101 is not limited.

Figure 4:
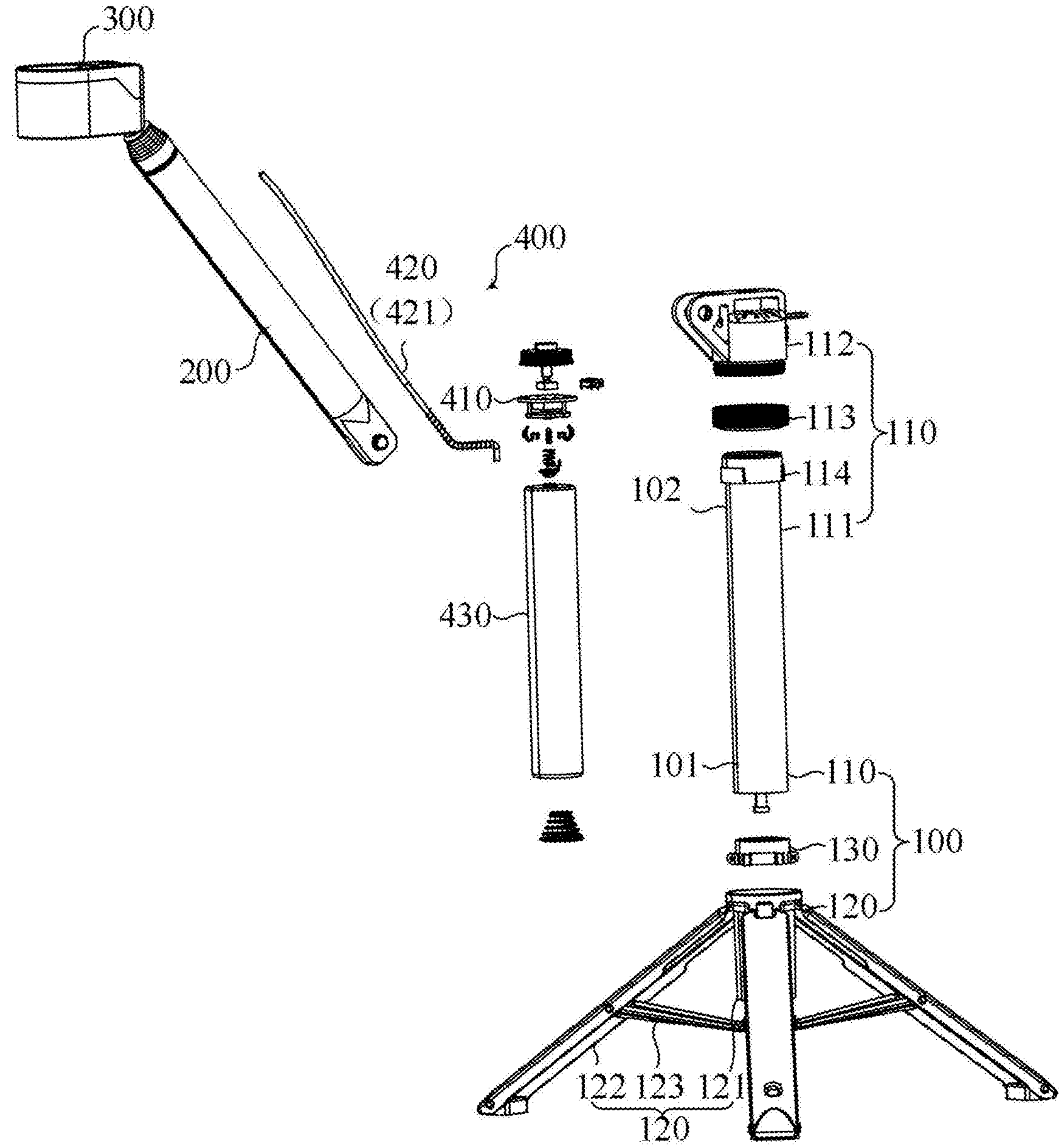
FIG. 4 is an exploded structural view of the lighting apparatus of FIG. 2.

In this embodiment, with reference to FIG. 3 and FIG. 4, the support rod 100, as a supporting body, comprises a central shaft 110 and a stand 120. The two axially opposite ends of the central shaft 110 correspond to the aforementioned supporting end 101 and mounting end 102, respectively. The lamp head 300 is connected to the mounting end 102 via the movable rod 200. The lamp head 300 is installed on an outer side of the mounting end 102 of the central shaft 110 and is circumferentially limited (the circumferential limitation herein means that the lamp head 300 cannot rotate about the circumference of the central shaft 110 relative to the mounting end 102). The stand 120 is connected to an outer side of the central shaft 110 and is in a deployed, supporting state to support the lighting apparatus on a supporting surface. In the present application, the deployed stand 120 can not only rotate circumferentially relative to the central shaft 110, allowing the lamp head 300 to synchronously rotate with the central shaft 110 relative to the stand 120 to change the circumferential lighting orientation of the lamp head 300, but the stand 120 can also slide axially relative to the central shaft 110, changing the deployment angle of the stand 120 and consequently the supporting height of the stand 120, thereby changing the illumination height of the lamp head 300.

Specifically, with reference to FIG. 3 and FIG. 4, the support rod 100 further comprises a support plate 130. The support plate 130 is rotatably connected to the supporting end 101 about a circumferential direction of the central shaft 110. The stand 120 comprises a collar 121, a plurality of legs 122, and a plurality of struts 123. The number of legs 122 and struts 123 are identical and correspond to each other. The collar 121 is sleeved on an outer side of the central shaft 110 and is capable of rotating circumferentially and sliding axially relative to the central shaft 110. Each leg 122 has a first end 1221 and a second end 1222 that are axially opposite to each other. The first end 1221 is rotatably connected to a side periphery of the collar 121, and the second ends 1222 are spaced apart from each other to be supported on the supporting surface. Each strut 123 is connected between the support plate 130 and a leg 122. Each strut 123 has a third end 1231 and a fourth end 1232 that are axially opposite to each other. The third end 1231 is pivotally (rotatably) connected to an inner side of the leg 122, and the fourth end 1232 is pivotally (rotatably) connected to a side periphery of the support plate 130.

The above structure enables the stand 120 to achieve circumferential rotation and axial sliding relative to the central shaft 110. The process is as follows: the collar 121 and the support plate 130 rotate synchronously relative to the central shaft 110, driving the legs 122 and the struts 123 to rotate synchronously relative to the central shaft 110, thereby realizing the circumferential rotation of the stand 120 relative to the central shaft 110. Preferably, in this embodiment, with reference to FIG. 2 to FIG. 3, the stand 120 can be switched from a retracted state (FIG. 2) to a deployed state (FIG. 3). The collar 121 slides along the axial direction of the central shaft 110 between the supporting end 101 and the mounting end 102. Specifically, when the collar 121 slides away from the mounting end 102, the first ends 1221 pivot outwards relative to the side periphery of the collar 121, simultaneously causing the plurality of second ends 1222 to switch from a mutually proximate retracted state to a mutually spaced-apart supporting state. Concurrently, the legs 122 drive the correspondingly connected third ends 1231 to switch from a mutually proximate retracted state to a mutually spaced-apart supporting state, while the fourth ends 1232 pivot outwards relative to the support plate 130. In this way, the plurality of legs 122 and the plurality of struts 123 switch from a retracted state (FIG. 2) to a deployed state (FIG. 3), thereby enabling the stand 120 to switch from the retracted state to the deployed state.

Figure 5:
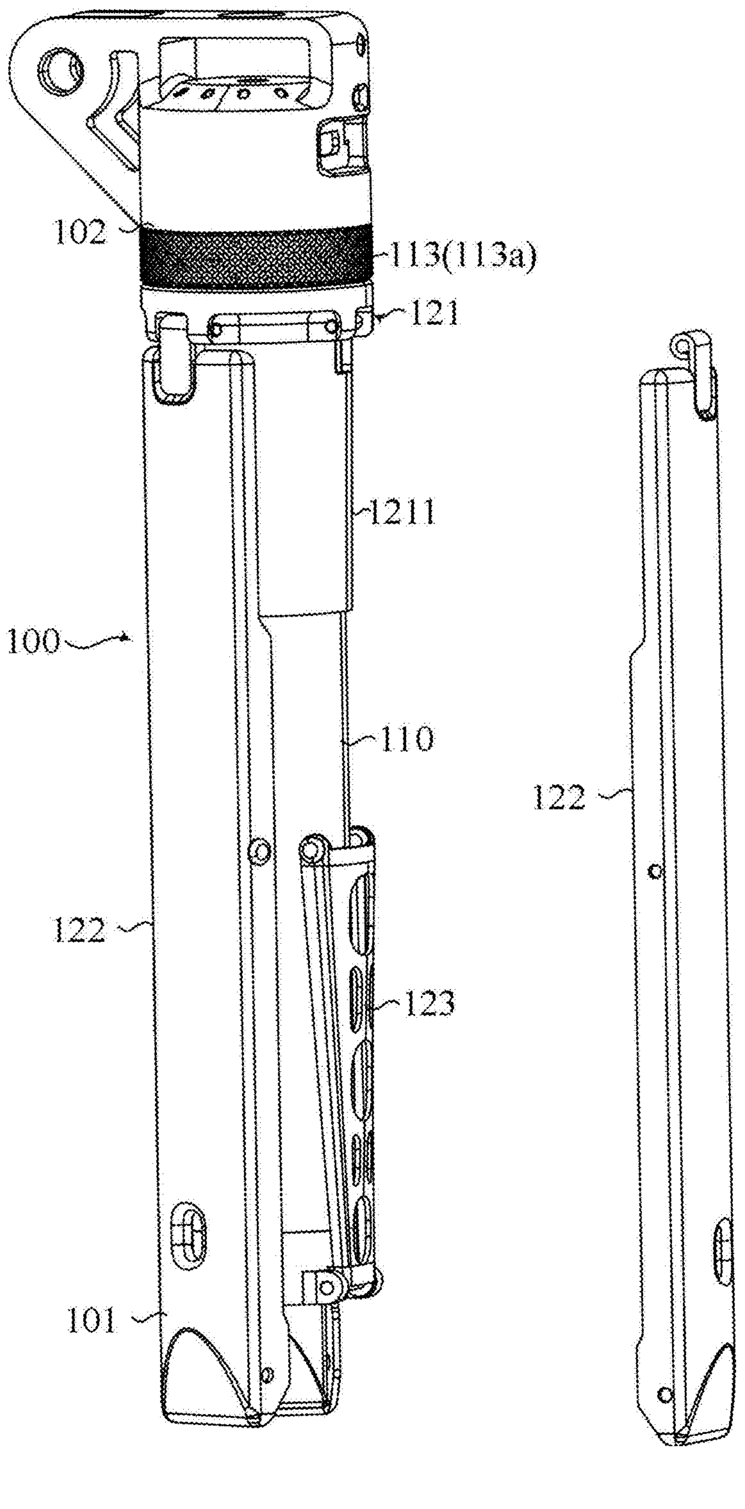
FIG. 5 is a partial exploded structural view of the support rod in the lighting apparatus of FIG. 1.
Figure 6:
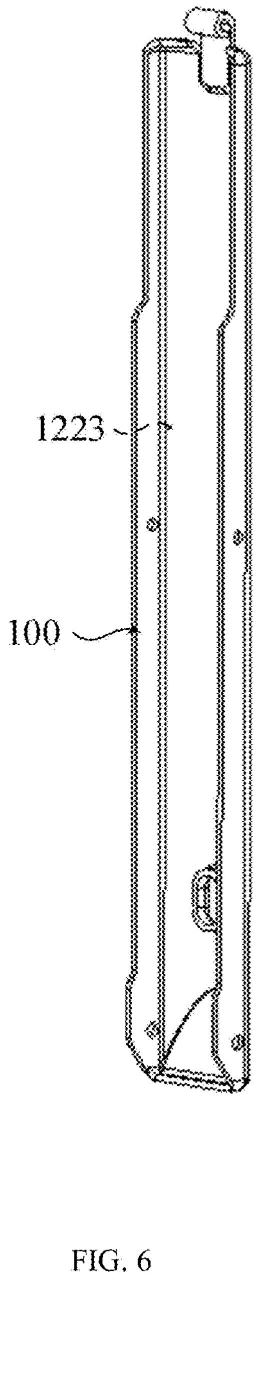
FIG. 6 is another perspective view of the leg in the exploded view of FIG. 5.

Preferably, in this embodiment, with reference to FIG. 3, the collar 121 is provided with a sleeve 1211 extending along the central shaft 110. The sleeve 1211 is sleeved on the outer wall of the central shaft 110 to allow the stand 120 to be more stably sleeved on the outer side of the central shaft 110. With reference to FIG. 5 and FIG. 6, when the stand 120 is in the retracted state, the sleeve 1211 is sleeved on the mounting end 102, the struts 123 are stowed side-by-side at the supporting end 101, and the collar 121 and the struts 123 are spaced apart and protrude from the outer wall of the central shaft 110 along the axial direction of the central shaft 110. Preferably, in this embodiment, an inner side of the leg 122 is provided with a receiving groove 1223. When the stand 120 is in the retracted state, the receiving groove 1223 receives the collar 121 and the strut 123. This design makes the structure of the entire support rod 100 more compact when the central shaft 110 and the stand 120 are in the retracted state.

It should be understood that, first, in other embodiments, where the stability of the stand 120 sleeved on the central shaft 110 is not a consideration, the collar 121 may not be provided with the extended sleeve 1211, and the stand 120 can be sleeved on the outer side of the central shaft 110 simply by the collar 121. Second, in other embodiments, where the compactness of the stowed structure of the support rod 100 is not a consideration, the inner side of the leg 122 may not be provided with the receiving groove 1223. Therefore, in the present application, the provision of the sleeve 1211 and the receiving groove 1223 is not limited.

For ease of understanding, with reference to FIG. 3, a planar triangle formed by the leg 122, the corresponding strut 123, and the central shaft 110 is defined as triangle abc. During the reciprocal sliding (movement) of the collar 121 along the axial direction of the central shaft 110, the magnitudes of the three interior angles of triangle abc change accordingly. The three interior angles of triangle abc correspond to the included angles between any two of each leg 122, a corresponding one of the plurality of struts 123, and the central shaft 110. Here, the direction of length extension of the central shaft 110 (parallel to the direction of the supporting height of the stand 120) remains unchanged, and the deployment height of the stand 120 changes accordingly. That is, the rotatably connected leg 122 and strut 123 can change the deployment angle and supporting height of the stand 120. When the stand 120 is in the retracted state (as shown in FIG. 2), the three interior angles of triangle abc are all 0 degrees. At this time, the plurality of legs 122 and the plurality of struts 123 are all in a side-by-side and adjacent posture with the central shaft. It should be understood that, in other embodiments, the collar 121 may not be able to cause the three interior angles of triangle abc to decrease to 0 degrees during its sliding process, meaning the stand 120 cannot be fully retracted. That is, in the present application, whether the stand 120 can be stowed by retraction is not limited, as long as the supporting height can be changed.

The present disclosure provides a lighting apparatus, comprising a lamp head 300, a central shaft 110, and a stand 120. The lamp head 300, as the primary illuminating element, is installed and connected to one end (the mounting end 102) of the central shaft 110. The stand 120 is sleeved on the central shaft 110 to form a support stand for supporting the lighting apparatus 10 on a supporting surface. With the lamp head 300 and the central shaft 110 being in a fixed relative position, the stand 120 can not only slide up and down relative to the central shaft 110 to change the illumination height of the lamp head 300, but the stand 120 can also rotate circumferentially relative to the central shaft 110 to change the circumferential lighting orientation of the lamp head 300. Therefore, compared to conventional lighting apparatuses, for the lighting apparatus 10 of the present disclosure, a user only needs to operate the sliding and rotating of the stand 120 relative to the central shaft 110 to correspondingly adjust the circumferential lighting orientation and illumination height of the lamp head 300. That is, the user can hold the central shaft with one hand and adjust the stand 120 with the other hand to achieve adjustments of both the illumination height and the circumferential lighting orientation. This is consistent with ergonomic design principles, significantly enhancing the convenience and practicality of the lighting apparatus 10 itself and improving the user experience.

Figure 7:
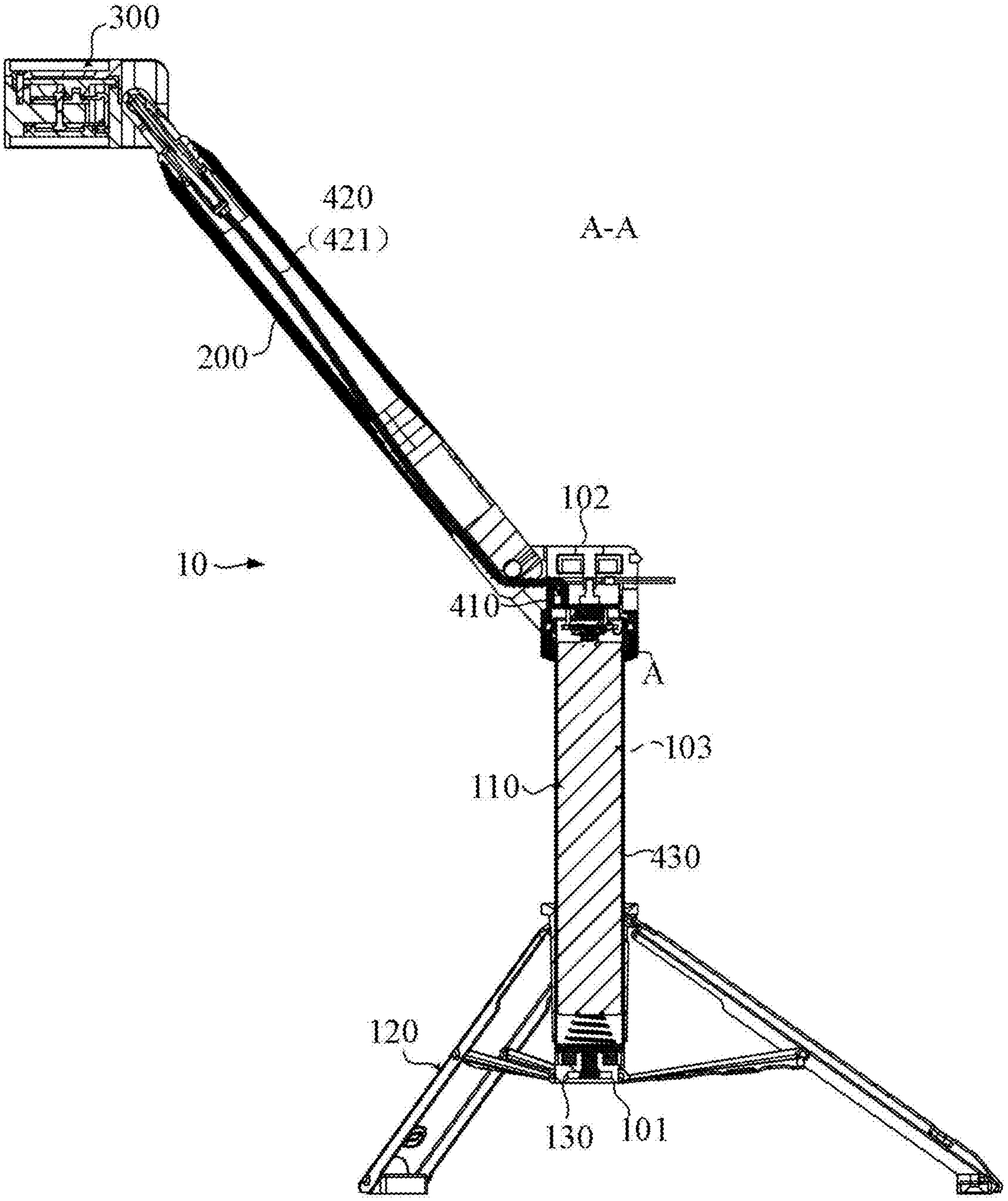
FIG. 7 is a cross-sectional structural view of the lighting apparatus of FIG. 3 taken along the line A-A.

Preferably, in the present application, with reference to FIG. 4 and FIG. 7, the lighting apparatus 10 further comprises a power supply assembly 400. The central shaft is provided with a mounting cavity 103, and the power supply assembly 400 is disposed within the mounting cavity 103. The power supply assembly 400 comprises a main board 410 and a power supply structure 420 disposed on the main board 410. The main board 410 is electrically connected to the lamp head 300 via the power supply structure 420. The main board 410 and the power supply structure 420 of the present disclosure can rotate circumferentially synchronously with the central shaft 110 relative to the stand 120. Consequently, the lamp head 300, the main board 410, and the power supply structure 420 can rotate synchronously with the central shaft 110 relative to the stand 120. This enhances the stability of the electrical contact of the entire lighting apparatus 10 and extends its operational life. It should be understood that, in other embodiments of the present application, where the stability of the electrical contact is not a consideration, whether the lamp head 300, the main board 410, and the power supply structure 420 rotate synchronously is not limited.

Figure 8:
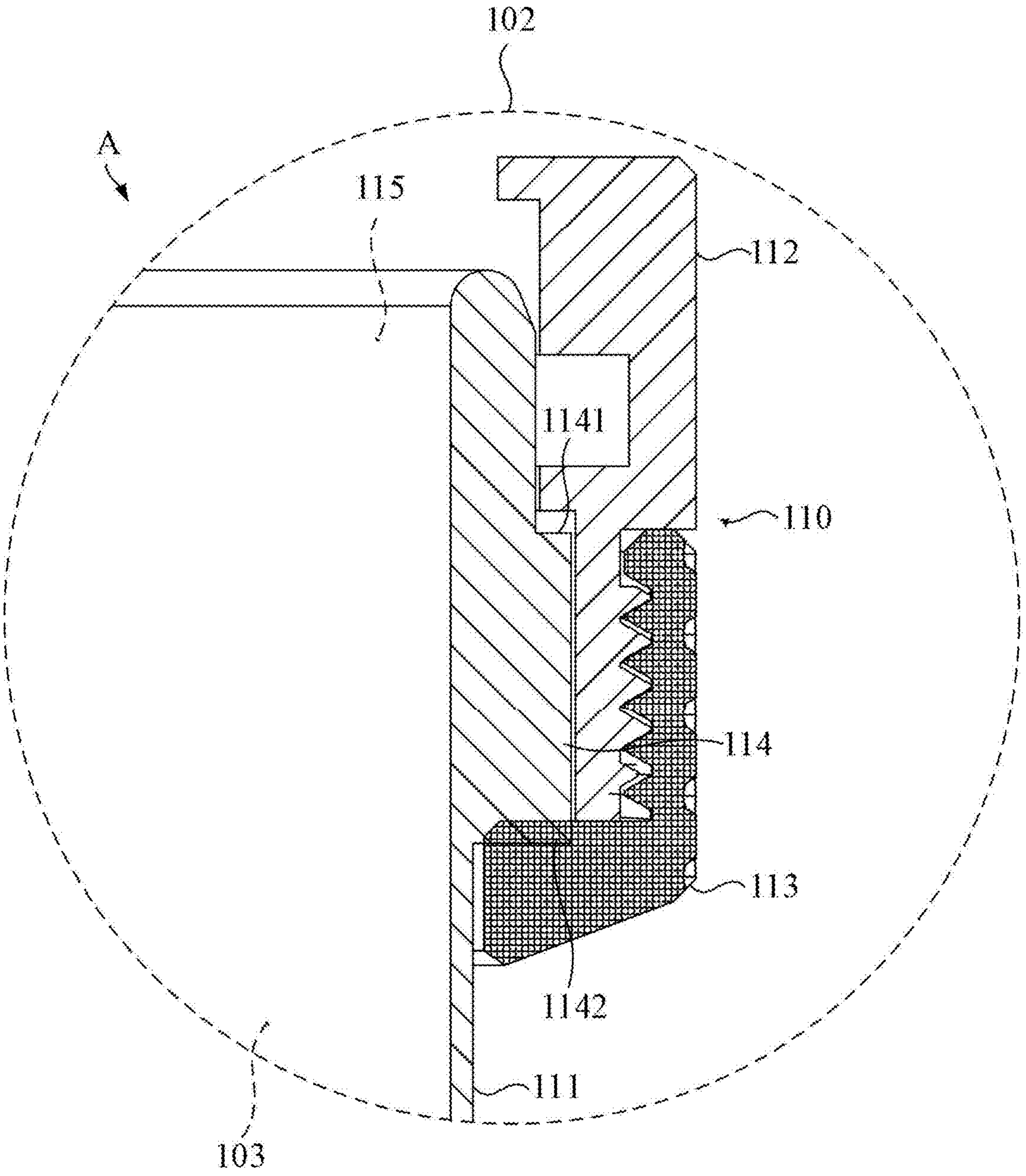
FIG. 8 is a partial enlarged structural view of portion A in the cross-sectional view of FIG. 7.

Preferably, in this embodiment, with reference to FIG. 4 and FIG. 8, the central shaft 110 comprises a tube body 111, a tube cover 112, and a nut 113. The two axially opposite ends of the tube body 111 correspond to the supporting end 101 and the mounting end 102, respectively. The tube body 111 is hollow to form the aforementioned mounting cavity 103. The mounting cavity 103 forms an opening 115 at the side of the mounting end 102. An outer side of the tube body 111 is provided with a retaining wall 114. The tube cover 112 covers and seals the opening 115 and is held against an upper side surface 1141 of the retaining wall 114. The tube cover 112 and the tube body 111 are detachably connected along the axial direction of the central shaft 110 via the nut 113. The nut 113 is sleeved on the outer wall of the tube body 111 and is threadedly connected to the tube cover 112. A side of the nut 113 facing away from the supporting end 101 is held against a lower side surface 1142 of the retaining wall 114. In this configuration, the lamp head 300 is installed on an outer side of the tube cover 112. The power supply structure 420 comprises a conductive wire 421. One end of the conductive wire 421 is electrically connected to the main board 410, and the other end passes through the opening 115 and extends out of the tube cover 112 to be electrically connected to the lamp head.

It should be understood that, first, disassembling the central shaft 110 into three detachable parts—the tube body 111, the tube cover 112, and the nut 113—facilitates the opening and closing of the mounting cavity 103, making it convenient to install and contain the power supply assembly within the mounting cavity 103. In other embodiments, where the convenience of opening and closing the mounting cavity 103 is not a consideration, the central shaft 110 can also be formed as a single piece. That is, in the present application, whether the central shaft 110 is detachable is not limited. Second, the retaining wall 114 is for positioning the tube cover 112 and the nut 113 for a snap-fit connection (the tube cover 112 abuts the upper side surface 1141 of the retaining wall 114, and the nut 113 abuts the lower side surface 1142 of the retaining wall 114). In other embodiments, the positions of the tube cover 112 and the nut 113 abutting the retaining wall 114 can be interchanged. It is even possible to dispense with the retaining wall 114, as the tube cover 112 and the nut 113 can still be threadedly connected. That is, in the present application, the provision of the retaining wall 114 is not limited. Furthermore, the power supply structure 420 is a specific means of achieving electrical connection, which includes, but is not limited to, a conductive wire 421, plug-in connectors, or conductive contact terminals. That is, the implementation of the power supply structure 420 in the present application is not limited, as long as it electrically connects the lamp head 300 and the main board 410 and allows for synchronous rotation with the central shaft 110.

With reference to FIG. 5 and FIG. 8, the nut 113 protrudes from the outer wall of the mounting end 102. When the stand 120 is in the stowed state (when the collar 121 slides to its farthest position from the supporting end 101), the collar 121 abuts against the nut 113 along the axial direction of the central shaft 110, which prevents the collar 121 from sliding off the central shaft 110 at the mounting end 102. It should be understood that, in other embodiments where the nut 113 is not provided, the outer side of the mounting end 102 needs to be provided with a stop portion 113*a* extending radially outward. In this case, when the collar 121 slides to its farthest position from the supporting end 101, the collar 121 abuts against the stop portion 113*a*, and the stop portion 113*a* prevents the collar 121 from sliding off the central shaft 110. Additionally, in other embodiments where the prevention of the collar 121 from sliding off the central shaft 110 is not a consideration, the stop portion 113*a* may not be provided. Therefore, in the present application, the provision of the nut 113 and the stop portion 113*a* is not limited.

Preferably, with reference to FIG. 4 and FIG. 7, in this embodiment, the power supply assembly 400 further comprises a battery 430. The battery 430 is electrically connected to the main board 410 and is accommodated in the first mounting cavity 103. When the central shaft 110 rotates circumferentially relative to the support plate 130, the battery 430 rotates synchronously with the central shaft 110 relative to the stand 120. It should be understood that, in other embodiments, the power supply assembly 400 may not be provided with the battery 430. The central shaft 110 can be provided with a power jack, which is electrically connected to the main board 410, and the power jack is plugged into an external power source to supply power to the lamp head 300. In addition, the battery 430 herein can be a dry cell battery, which needs to be replaced when its energy is depleted, or it can be a rechargeable battery, which can be reused by charging through an external power source. That is, in the present application, the presence and the type of the battery 430 are not limited.

Figure 9:
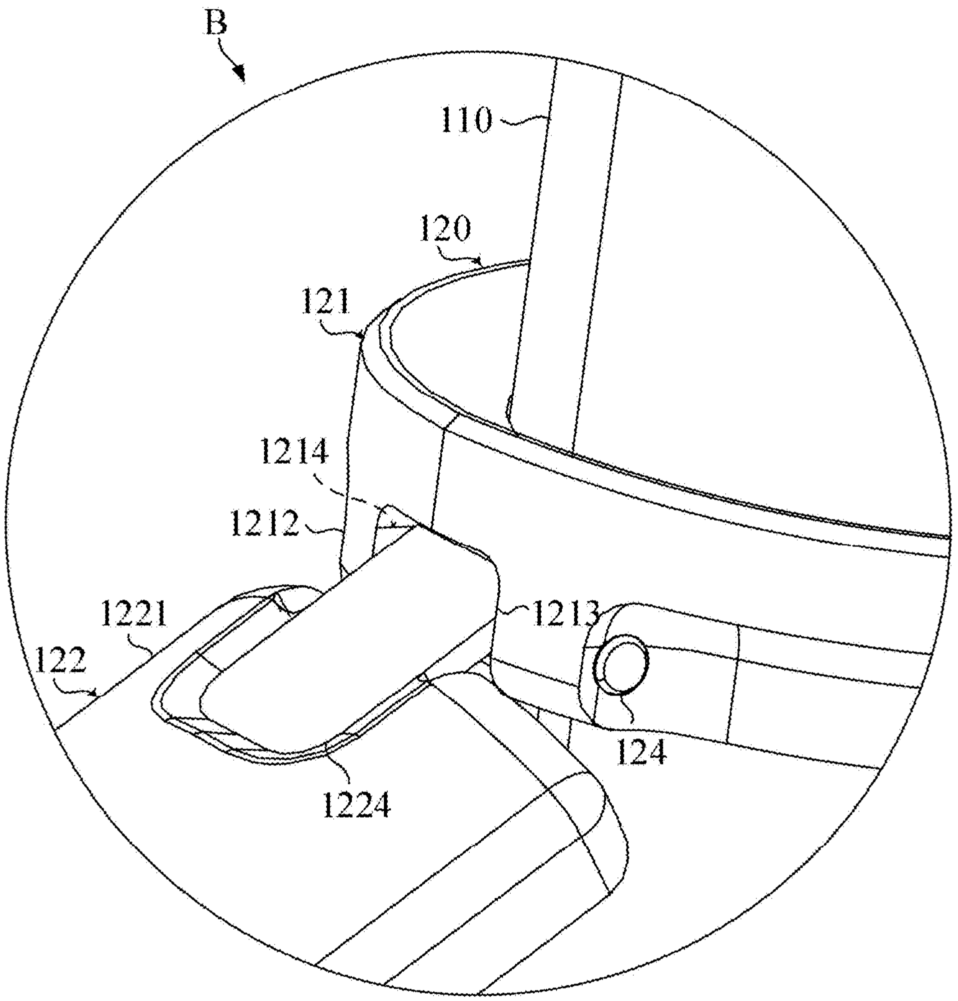
FIG. 9 is a partial enlarged structural view of portion B of the lighting apparatus of FIG. 3.
Figure 10:
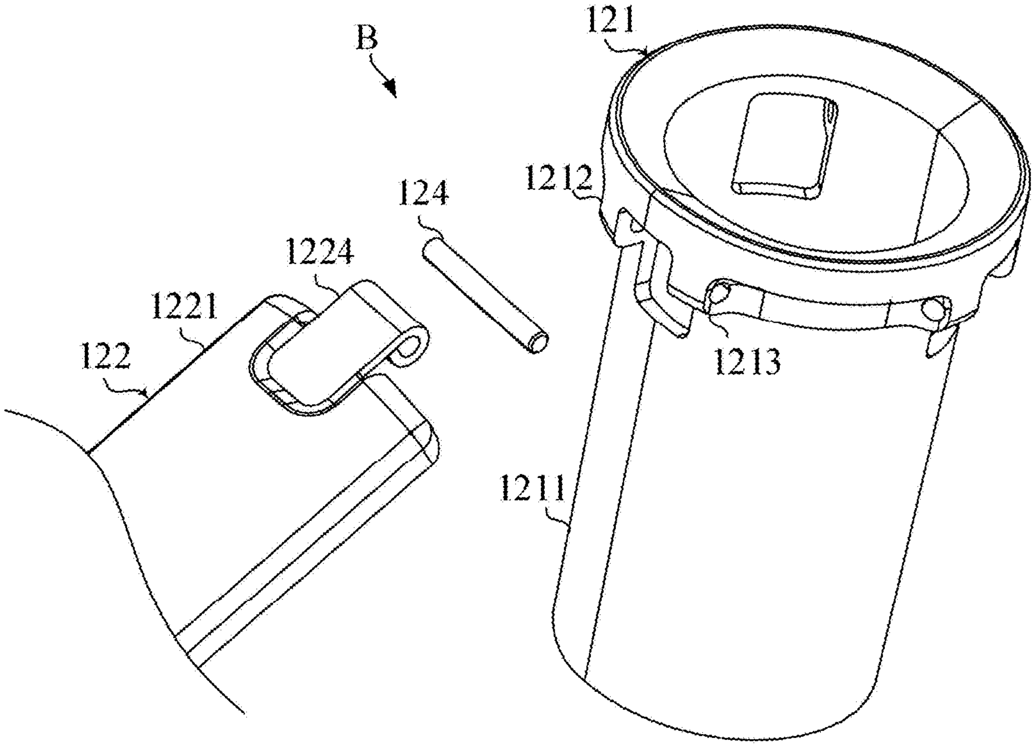
FIG. 10 is an exploded view of the partial enlarged view of FIG. 9.

Preferably, in this embodiment, with reference to FIG. 9 and FIG. 10, the leg 122 rotates relative to the collar 121 about a first rotation axis 124. The first rotation axis 124 is simultaneously perpendicular to the axial direction and the radial direction of the central shaft 110 and is uniformly distributed around the side periphery of the collar 121. The first end 1221 is connected with a connecting block 1224. The side periphery of the collar 121 is provided with a plurality of sets of spaced-apart and opposing first lugs 1212 and second lugs 1213. The first rotation axis 124 passes sequentially through the first lug 1212, the connecting block 1224, and the second lug 1213 along its axial direction to achieve the rotational connection between the first end 1221 and the collar 121. A clearance gap 1214 is formed between the first lug 1212 and the second lug 1213. When the first end 1221 rotates relative to the collar 121, the clearance gap 1214 allows for the pivoting movement of the connecting block 1224. It should be understood that the connecting block 1224 is rotatably connected to the first lug 1212 and the second lug 1213 via the first rotation axis 124, thereby achieving the rotational connection of the first end 1221 to the collar 121. In other embodiments, first, the connecting block 1224 can be connected to the collar 121, and the first lug 1212 and the second lug 1213 can protrude from and be spaced apart on the end of the first end 1221. The first rotation axis 124 can still pass sequentially through the first lug 1212, the connecting block 1224, and the second lug 1213 along its axial direction to achieve the rotational connection between the first end 1221 and the collar 121. Second, even without providing the first lug 1212, the connecting block 1224, and the second lug 1213, by creating grooves or holes in the collar 121 or the first end 1221, the first rotation axis 124 can pass through the first end 1221 and the collar 121, thereby also achieving the rotational connection of the first end 1221 to the collar 121, which enables the pivoting movement of the leg 122 relative to the collar 121. That is, in the present application, the method of rotational connection between the first end 1221 and the collar 121 is not limited. Moreover, the number of lugs and connecting blocks in the above rotational connection method is not limited, as long as there is at least one of each and they can be passed through by the first rotation axis 124.

Preferably, with reference to FIG. 3, the second end 1222 of the leg 122 is rotatably connected to a support pad 125. A user can rotate and adjust the support pad 125 to subject the stand 120 to a reaction force along the axial direction of the central shaft 110 at any support angle, thereby meeting the demand for the lighting apparatus 10 to be stably supported on different supporting surfaces. It should be understood that, in other embodiments, if the supporting surface is flat and the support force does not require adjustment for balance, the leg 122 may not be provided with the support pad 125. Therefore, in the present application, the number and shape of the support pads 125 are not limited.

In the description of the present application, it should be noted that, unless otherwise explicitly specified and limited, the terms "disposed," "connected," and "connection" should be broadly understood. For example, a connection may be a fixed connection, a detachable connection, or an integral connection; may be a mechanical connection or an electrical connection; may be a direct connection or an indirect connection through an intermediate medium; and may be communication between interiors of two components. Those of ordinary skill in the art may understand the specific meanings of the above terms in the present application based on specific contexts.

Although the present disclosure has been described with reference to several typical embodiments, it should be understood that the terminology used is illustrative and exemplary rather than restrictive. Since the present disclosure can be implemented in various forms without departing from its spirit or essence, it should be understood that the above-described embodiments are not limited by any foregoing details but should be broadly interpreted within the spirit and scope defined by the appended claims. Therefore, all changes and modifications falling within the scope of the claims or equivalents thereof should be covered by the appended claims.

What is claimed is:

1. A lighting apparatus, comprising:

a central shaft having a mounting end and a supporting end that are axially opposite to each other;

a lamp head connected to the mounting end;

a support plate rotatably connected to the supporting end about a circumferential direction of the central shaft; and a stand, comprising a collar, a plurality of legs, and a plurality of struts, wherein the collar is sleeved on an outer wall of the central shaft, each of the legs has a first end and a second end that are axially opposite to each other, the first end is rotatably connected to a side periphery of the collar, and the second ends are configured to be spaced apart from each other to be supported on a supporting surface; each of the struts is connected between the support plate and one of the legs, and each of the struts has a third end and a fourth end that are axially opposite to each other, the third end is pivotally connected to an inner side of the corresponding leg, and the fourth end is pivotally connected to a side periphery of the support plate;

wherein the collar is configured to be reciprocally movable along an axial direction of the central shaft to change an included angle between any two of each leg, a corresponding one of the plurality of struts, and the central shaft, thereby changing a height of the stand; and the central shaft and the lamp head are configured to be rotatable synchronously with respect to the stand about the circumferential direction of the central shaft.

2. The lighting apparatus according to claim 1, wherein the included angle between any two of each leg, a corresponding one of the plurality of struts, and the central shaft is reducible to 0 degrees, such that the plurality of legs and the plurality of struts are in a side-by-side and adjacent posture with the central shaft, and the stand is switched from a deployed state to a retracted state.

3. The lighting apparatus according to claim 2, wherein the collar is connected with a sleeve extending along the axial direction of the central shaft, the sleeve being sleeved on the outer wall of the central shaft; and when the stand is in the retracted state, the sleeve is sleeved on the mounting end, the struts are stowed side-by-side at the supporting end, and the collar and the struts are spaced apart and protrude from the outer wall of the central shaft along the axial direction of the central shaft.

4. The lighting apparatus according to claim 2, wherein an inner side of each of the legs is provided with a receiving groove, and when the stand is in the retracted state, the receiving groove is configured to receive a corresponding strut and the collar.

5. The lighting apparatus according to claim 1, wherein an outer side of the mounting end is provided with a stop portion extending radially outward, and when the collar slides to a position farthest from the supporting end, the collar abuts against the stop portion.

6. The lighting apparatus according to claim 1, further comprising a power supply assembly, wherein the central shaft is provided with a mounting cavity, the power supply assembly is disposed within the mounting cavity, the power supply assembly comprises a main board and a power supply structure disposed on the main board, and the main board is electrically connected to the lamp head via the power supply structure; and when the central shaft rotates circumferentially relative to the support plate, the lamp head, the main board, and the power supply structure rotate synchronously with the central shaft relative to the stand.

7. The lighting apparatus according to claim 6, wherein the central shaft comprises a tube body, a tube cover, and a nut; the tube body has two ends along its axial direction, corresponding to the mounting end and the supporting end, the tube body being provided with the mounting cavity, the mounting cavity forming an opening at the mounting end, and an outer side of the tube body being provided with a retaining wall; the tube cover seals the opening and is held against an upper side surface of the retaining wall; the tube cover and the tube body are detachably connected via the nut along the axial direction of the central shaft, the nut is sleeved on an outer wall of the tube body and is threadedly connected to the tube cover, and a side of the nut facing away from the supporting end is held against a lower side surface of the retaining wall; wherein the lamp head is installed on an outer side of the tube cover, the power supply structure comprises a conductive wire, one end of the conductive wire is electrically connected to the main board, and the other end passes through the opening and extends out of the tube cover to be electrically connected to the lamp head.

8. The lighting apparatus according to claim 1, wherein each of the legs rotates relative to the collar about a first rotation axis, the first rotation axis being simultaneously perpendicular to the axial direction of the central shaft and a radial direction of the central shaft; one of the first end and the collar is provided with a protruding connecting block, and the other one is provided with a spaced-apart and opposing first lug and second lug, the first rotation axis passing sequentially through the first lug, the connecting block, and the second lug; a clearance gap is formed between the first lug and the second lug, the clearance gap allowing for a pivoting movement of the connecting block.

9. The lighting apparatus according to claim 1, wherein the second end is rotatably connected to a support pad, and an adjustment of the support pad is configured to cause the stand to be subjected to a reaction force along the axial direction of the central shaft at any support angle.

10. The lighting apparatus according to claim 1, further comprising a movable rod having a first connecting end and a second connecting end that are axially opposite to each other, the first connecting end being rotatably connected to the mounting end, and the second connecting end being connected to the lamp head; wherein the first connecting end is configured to be pivotable relative to the mounting end until the movable rod and the central shaft are in a side-by-side and adjacent posture, and the lamp head is configured to clasp onto the supporting end.

* * * * *